Sept. 7, 1948.  G. B. MIRUS  2,448,614
MOTOR DRIVE FOR BRUSHES AND THE LIKE
Filed Sept. 14, 1944  2 Sheets-Sheet 1

Inventor
Gilbert Bernard Mirus,
By [signature]
Attorney

Sept. 7, 1948. G. B. MIRUS 2,448,614
MOTOR DRIVE FOR BRUSHES AND THE LIKE
Filed Sept. 14, 1944 2 Sheets-Sheet 2

Inventor
Gilbert Bernard Mirus,

Patented Sept. 7, 1948

2,448,614

UNITED STATES PATENT OFFICE 2,448,614

MOTOR DRIVE FOR BRUSHES AND THE LIKE

Gilbert B. Mirus, Akron, Ohio

Application September 14, 1944, Serial No. 554,082

2 Claims. (Cl. 172—36)

The present invention relates to power-driven implements and particularly to power-driven brushes or the like.

A general object of the invention is to provide a novel economical, easily manufactured and compact electrically driven brush of wide utility including brushing teeth and massaging gums, cleaning and polishing silverware, polishing fingernails, and other like uses.

Another object is to provide a novel rotary brush or the like driven by an electric motor, which maintains brush rotation at a suitable speed, whereby any ingredient with which the brush may be coated for cleaning or polishing purposes will not be thrown off by centrifugal action.

Another object of the invention is to provide in combination with a small compact electric motor, a set of speed reduction gears, whereby a low speed of rotation is transmitted to the shaft of a tooth brush, and/or gum massage implement, so as not to harm either the gums or mucous membranes of the mouth.

Another object is to provide means for controlling the direction of rotation of a rotary tooth brush, and/or gum massage device, whereby the brush may always be rotated toward the edge of the teeth, if desired.

A further object is to provide in a rotary brush implement, a novel frame for mounting an electric motor, an associated speed reduction gear train, and a rotary shaft adapted to have a quick detachable connection with a suitable brush element, whereby a suitable casing of plastic or the like may be mounted around the frame to thereby obtain an attractive, compact and easily handled article of manufacture.

A further object is to provide a novel rotary electric tooth brush for household use, whereby brush attachments of various colors may be quickly attached and detached from a power shaft for use by different members of the same family.

Still a further object of the invention is to provide a novel casing for the driving and driven parts of an electrical tooth brush which is so shaped and so proportioned as to fit conveniently in the palm of the user's hand, and which is formed at each end so as to define aligned apertures for mounting annular bushings therein, whereby the brush actuator shaft and power leads from the motor when seated therein cooperate to align the part supporting frame within the casing to thereby speed up the assembly of the device.

The above and other objects and advantages of the present invention will appear more fully herein from a consideration of the detailed description which follows, taken together with the accompanying drawings wherein the features of the present invention are illustrated. It is to be expressly understood, however, that the drawings are for the purpose of illustration only and are not designed as a definition of the limits of the invention.

In the drawings wherein like reference characters refer to like parts throughout the several views.

Figure 3:
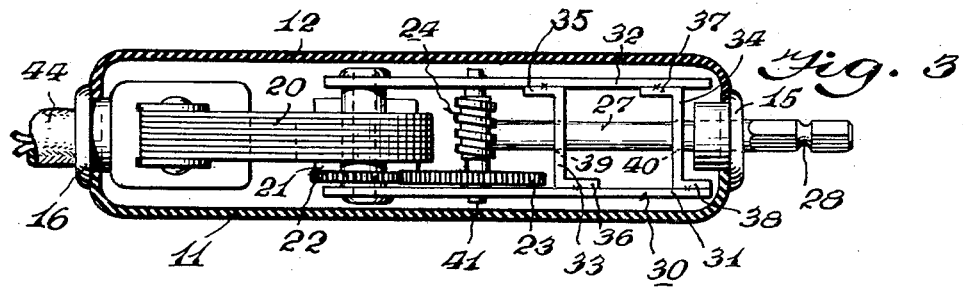
Figure 3 is a top longitudinal cross sectional view of the casing showing the several elements mounted therein.

Referring to the drawings and first with particular reference to Figure 3, there is illustrated a casing 10, which may be formed in two sections 11 and 12. Each section 11 and 12 is formed, so as to define the casing 10 and a pair of aligned apertures at each end in which are mounted bushings 15 and 16 when the sections are secured together by bolts 13.

Figure 1:
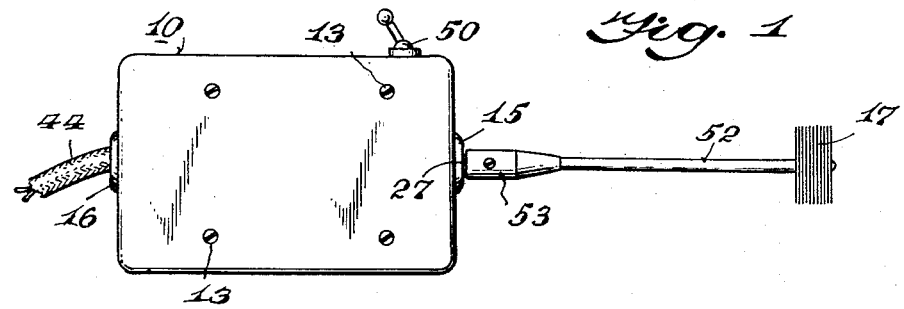
Figure 1 is a side view of the assembled implement with its sectional casing fastened together.
Figure 2:
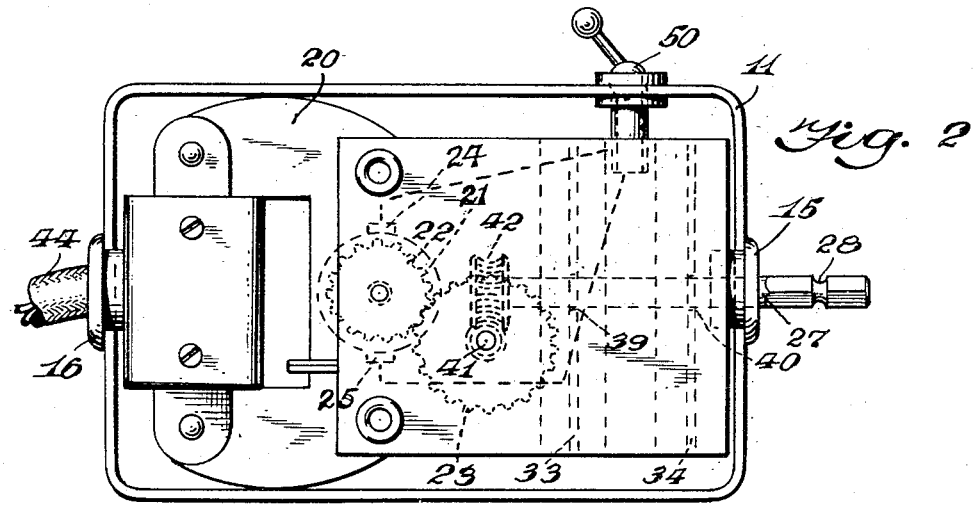
Figure 2 is a side view partly in elevation of the implement with one section of the casing removed, and also showing the electrical circuit between the motor brushes and the actuating switch super-imposed thereon.

The bushings 15 and 16 may each be secured in one section of the casing 10, such for example as section 11, shown in Figure 2, for the purpose of aiding in the proper alignment of the parts to be housed within the casing 10, as will appear from the following description of the driving and driven elements.

Within the casing 10 is mounted an electric motor 20 of any suitable type, such as reversible alternating current single phase motor or the like, although if desired a reversible direct current motor may be used in some instances. Also, if desired, the motor 20 may be designed to operate on either D. C. or A. C. current, so that it may be used on trains or in hotels supplying direct current or in house circuits supplying alternating current. Associated with the driving motor 20 is a speed reduction gear train of a desirable predetermined ratio comprising a gear 22 mounted on the rotor 21 of the motor 20, a relatively larger gear 23 in mesh with gear 22, and a worm drive 24 connected to the end of an elongated shaft 27 containing an annular coupling groove 28 for the brush attachments. These elements are all separately mounted within a frame 30 particularly adapted to nest within the sections 11 and 12, respectively, of the casing 10.

The frame 30 comprises a pair of plates 31 and 32 spaced apart by braces or brackets 33 and 34. Each bracket may be formed so as to define base portions 35 and 36, and 37 and 38 respectively, on alternate sides thereof, and may be substantially Z-shaped in transverse cross section, as shown in Figure 3 of the drawings or channel shaped as desired. The several base portions 35—36 and 37—38 are secured to the plates 31 and 32 of the frame 30 by any suitable means, as by welding or the like, and are each centrally apertured at points 39 and 40 so as to define aligned bearing surfaces to thereby journal the shaft 27 therein.

Thus when the frame 30 is nested in one section of the casing 10 so that shaft 27 extends through bushing 15 the entire mechanism is aligned within the casing, it, of course, being understood that a power cable 44 is threaded through bushing 16 at the other end of the casing section, or, if desired, in place of bushing 16 an electrical plug in socket may be provided. The two sections 11 and 12 are then bolted together for the final assembly of the article.

Spaced rearwardly of the brackets 33 and 34 and journaled within the plates 31 and 32 is a worm shaft 41, which extends transverse the end of shaft 27 on which is mounted a worm gear 42, to thereby constitute the hereinbefore referred to worm drive 24 of the speed reduction gear train driven from motor 20.

The motor 20 seats snugly within the casing 10 so as to contact the top and bottom sides of each section 11 and 12 and is connected to the power cable 44, which connects with the power line by suitable means, such as a quick detachable plug, not shown.

Figure 4:
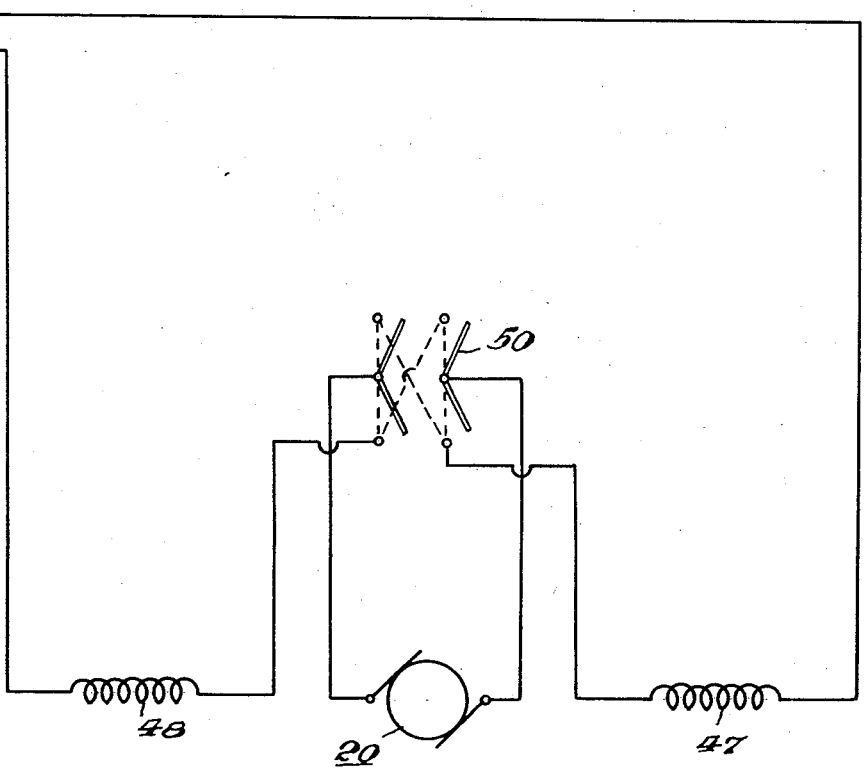
Figure 4 is a diagrammatic view of a complete simple electrical circuit such as is partly shown super-imposed on Figure 2.
Figure 5:
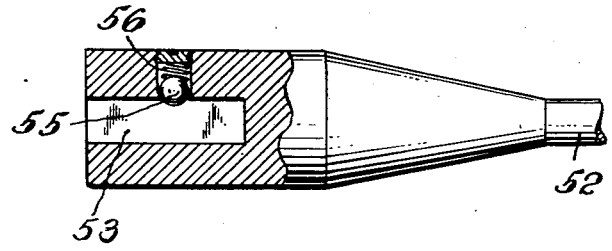
Figure 5 illustrates a form of quick detachable connection for the tooth brush attachments partly in cross section.

To illustrate one form of electrical circuit and motor, the diagram in, Figure 4, shows leads 45 and 46 connected through the stator windings 47 and 48 of the motor 20 to a switch 50, such as a two-pole double throw snap switch, for example. Thus the motor 20 may be driven in either direction by reversing the position of the switch 50 to thereby cause the current to flow through the motor from the opposite lead, as the case may be.

The actuator for the switch 50 is mounted in the top of casing 10 and the switch connects with brushes 24 and 25 of the motor 20 to the switch 50 as is illustrated in Figures 2 and 4 of the drawings.

Any number of attachments of different type, such as polishers, gum massagers, tooth brushes, or the like, may be provided for coupling onto the end of shaft 27 which extends from the casing 10 through bushing 15.

Each attachment includes a suitable head, such as for example, a brush 17 having an elongated shank portion 52 and a socket 53. In a wall of the socket 53 is provided a traverse opening in which is mounted a plug and coil spring 56, which spring 56 normally projects a ball 55 into the socket opening, an extent substantially equal to the depth of the annular groove 28 adjacent the end of shaft 27, so that when an attachment slides onto the shaft 27, the spring-pressed ball 56 snaps into the groove 28.

Thus I have provided a novel electrically driven rotary implement for household uses, such as, for example, a tooth brush having quick detachable means arranged for use by separate members of the same family and having a conveniently shaped and compact casing for use as a handle adapted to house a novel frame designed so as to mount a gear reduction train and associated drive motor, and to provide a two-point journaling arrangement for the rotary implement actuator shaft, whereby expensive bearing structures and mountings may be eliminated. Also, there is thus provided a novel electric implement rotatable in either direction, wherein the rotation is controlled to a desirable number of revolutions per minute, such, for example, as four hundred revolutions per minute or less, so that any type of polishing compound dentifrice or the like may be used without the possibility of its being thrown off by centrifugal force, and further so that the low speed of rotation of the implement will not harm either the gums or mucous membranes of the mouth when used as a tooth brush or a gum massage.

While the several features of my invention have been illustrated and described in considerable detail as an embodiment of substantially only one form of the novel device, other changes and modifications, which will now appear to those skilled in the art, may be made without departing from the scope of the present invention. Reference for this latter purpose should be had to the appended claims.

I claim:

1. The combination with a sectional housing for a motor, a shaft, and power transmitting means between the motor and shaft, of a frame positioned within the housing connected to an end of said motor, comprising spaced parallel walls having apertures forming journals for said power transmitting means, and transverse braces secured between the walls and formed with aligned apertures forming bearing surfaces for the said shaft, said braces each having oppositely extending bases at each end secured to the said walls, to thereby provide a rigid unitary structure with respect to said housing.

2. The combination with a sectional housing, of a frame within the housing and comprising spaced parallel walls, an electric motor having a rotor, a shaft extending exterior of the housing, and power transmitting means therebetween, said walls being apertured to form journal supports for the rotor of said motor and power transmitting means, and transverse braces secured between the walls and having aligned apertures forming journals for the said shaft, the said frame and supported assembly being unitary with respect to the housing.

G. B. MIRUS.

REFERENCES CITED

The following references are of record in the file of this patent:

UNITED STATES PATENTS

| Number | Name | Date |
|---|---|---|
| 1,792,188 | Robeg | Feb. 10, 1931 |
| 1,828,895 | Hanley | Oct. 27, 1931 |
| 1,926,223 | Albera | Sept. 12, 1933 |
| 1,961,243 | Pererra | June 5, 1934 |
| 1,969,549 | Eppstein | Aug. 7, 1934 |
| 1,981,688 | Conti | Nov. 20, 1934 |
| 2,146,551 | Putnam | Feb. 7, 1939 |
| 2,210,094 | Mueller | Aug. 6, 1940 |
| 2,231,466 | Hanley | Feb. 11, 1941 |
| 2,232,363 | Brennan | Feb. 18, 1941 |
| 2,314,117 | Beckner | Mar. 16, 1943 |